United States Patent
Yang et al.

(10) Patent No.: US 10,430,573 B2
(45) Date of Patent: *Oct. 1, 2019

(54) METHOD FOR CONTROLLING UNLOCKING AND TERMINAL DEVICE

(71) Applicant: Guangdong Oppo Mobile Telecommunications Corp., Ltd., Dongguan, Guangdong (CN)

(72) Inventors: Le Yang, Guangdong (CN); Yibao Zhou, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/988,919

(22) Filed: May 24, 2018

(65) Prior Publication Data

US 2018/0268123 A1    Sep. 20, 2018

Related U.S. Application Data

(63) Continuation of application No. 15/846,237, filed on Dec. 19, 2017, which is a continuation of application No. PCT/CN2016/087775, filed on Jun. 29, 2016.

(30) Foreign Application Priority Data

Mar. 14, 2016    (CN) .......................... 2016 1 0146753

(51) Int. Cl.
*G06F 21/32*    (2013.01)
*G06F 21/36*    (2013.01)
(Continued)

(52) U.S. Cl.
CPC .............. *G06F 21/32* (2013.01); *G06F 21/36* (2013.01); *G06K 9/00087* (2013.01);
(Continued)

(58) Field of Classification Search
CPC ..... G06F 21/32; G06F 21/36; G06K 9/00087; H04W 12/06; H04W 88/02; H04L 63/0861
See application file for complete search history.

(56) References Cited

U.S. PATENT DOCUMENTS 6,980,672 B2 * 12/2005 Saito .................. G06K 9/00006
340/5.53
7,979,716 B2 *  7/2011 Fiske ...................... G06F 21/32
711/164
(Continued)

FOREIGN PATENT DOCUMENTS

CN        103092503 A    5/2013
CN        103745147 A    4/2014
(Continued)

OTHER PUBLICATIONS

Extended European search report issued in corresponding European application No. 16894080.7 dated Jun. 19, 2018.

*Primary Examiner* — Joseph P Hirl
*Assistant Examiner* — Stephen T Gundry
(74) *Attorney, Agent, or Firm* — Young Basile Hanlon & MacFarlane, P.C.

(57) ABSTRACT

A method for controlling unlocking is provided. A password matching process is performed on a screen unlock password, an interrupt request is triggered and an original fingerprint image is acquired, and a fingerprint identification process is performed on the original fingerprint image, when a terminal device is in a screen-off state and the screen unlock password input by a user and a touch-press operation of the user on a fingerprint identification module of the terminal device are detected. A screen of the terminal device is lit up, when the password matching process is successful and the fingerprint identification process is successful.

15 Claims, 8 Drawing Sheets

(51) Int. Cl.
  *H04W 12/06* (2009.01)
  *G06K 9/00* (2006.01)
  *H04L 29/06* (2006.01)
  *H04W 88/02* (2009.01)
  *H04W 12/00* (2009.01)

(52) U.S. Cl.
  CPC ......... *H04W 12/06* (2013.01); *H04L 63/0861* (2013.01); *H04W 12/00508* (2019.01); *H04W 88/02* (2013.01)

(56) References Cited

U.S. PATENT DOCUMENTS

| | | | | |
|---|---|---|---|---|
| 8,904,479 | B1* | 12/2014 | Johansson | G06F 21/36 726/2 |
| 9,021,270 | B1* | 4/2015 | Byers | H04L 63/0861 713/186 |
| 9,432,367 | B2* | 8/2016 | Wei | G06F 21/32 |
| 9,600,709 | B2* | 3/2017 | Russo | G06K 9/00087 |
| 9,696,762 | B2* | 7/2017 | Zhang | E05B 47/026 |
| 9,733,752 | B2* | 8/2017 | Park | G06F 3/0412 |
| 9,779,419 | B2* | 10/2017 | Jung | H04W 4/02 |
| 9,928,355 | B2* | 3/2018 | Boshra | G06F 21/32 |
| 9,940,448 | B2* | 4/2018 | Bao | G06F 21/32 |
| 10,013,595 | B2* | 7/2018 | Sreenivas | G06F 3/041 |
| 2004/0021552 | A1* | 2/2004 | Koo | G07C 9/00087 340/5.53 |
| 2006/0034497 | A1* | 2/2006 | Manansala | G06K 9/001 382/124 |
| 2008/0024272 | A1* | 1/2008 | Fiske | E05B 47/0002 340/5.83 |
| 2009/0002126 | A1* | 1/2009 | Okazaki | G06F 21/32 340/5.53 |
| 2009/0224874 | A1* | 9/2009 | Dewar | G06F 21/32 340/5.53 |
| 2009/0258667 | A1* | 10/2009 | Suzuki | G06F 21/32 455/550.1 |
| 2010/0009658 | A1 | 1/2010 | Wu et al. | |
| 2010/0225607 | A1* | 9/2010 | Kim | G06F 3/042 345/173 |
| 2011/0080260 | A1* | 4/2011 | Wang | G06F 21/32 340/5.83 |
| 2012/0071149 | A1* | 3/2012 | Bandyopadhyay | G06F 1/1643 455/418 |
| 2014/0143859 | A1 | 5/2014 | Linge | |
| 2014/0295795 | A1* | 10/2014 | Miyazaki | H04W 12/06 455/411 |
| 2014/0320396 | A1* | 10/2014 | Modarres | G06F 3/0412 345/156 |
| 2014/0376181 | A1* | 12/2014 | Zhang | E05B 47/026 361/679.55 |
| 2015/0089631 | A1* | 3/2015 | Bao | G06F 21/32 726/16 |
| 2015/0294101 | A1* | 10/2015 | Wen | G06F 21/32 726/28 |
| 2015/0350202 | A1* | 12/2015 | Wei | G06F 21/32 726/18 |
| 2015/0378595 | A1* | 12/2015 | Jung | H04W 4/02 715/835 |
| 2016/0140379 | A1* | 5/2016 | Pedersen | G06K 9/00919 726/19 |
| 2016/0203306 | A1* | 7/2016 | Boshra | G06F 21/32 726/19 |
| 2016/0210624 | A1 | 7/2016 | Niu | |
| 2016/0295007 | A1* | 10/2016 | Zhu | H04L 63/083 |
| 2016/0328594 | A1* | 11/2016 | Che | G06K 9/00046 |
| 2016/0350523 | A1* | 12/2016 | Tanno | G06F 21/44 |
| 2017/0039410 | A1* | 2/2017 | Pi | G06F 1/1643 |
| 2017/0039414 | A1* | 2/2017 | Sreenivas | G06F 3/041 |
| 2017/0063852 | A1* | 3/2017 | Azar | G06F 21/32 |
| 2017/0091523 | A1* | 3/2017 | Chen | G06K 9/4652 |
| 2017/0185765 | A1* | 6/2017 | Pang | G06F 21/32 |
| 2017/0200039 | A1* | 7/2017 | Wright | G06K 9/00026 |
| 2017/0220843 | A1* | 8/2017 | Apostolos | H04M 1/673 |
| 2017/0286660 | A1* | 10/2017 | Li | G06F 21/32 |
| 2017/0372055 | A1* | 12/2017 | Robinson | H04W 12/06 |

FOREIGN PATENT DOCUMENTS

| | | |
|---|---|---|
| CN | 103823632 A | 5/2014 |
| CN | 104091103 A | 10/2014 |
| CN | 104391635 A | 3/2015 |
| CN | 104503631 A | 4/2015 |
| CN | 104573485 A | 4/2015 |
| CN | 104994222 A | 10/2015 |
| CN | 105260105 A | 1/2016 |
| CN | 105303090 A | 2/2016 |
| CN | 105389566 A | 3/2016 |
| EP | 1452944 A2 | 9/2004 |
| EP | 2192513 A1 | 6/2010 |

* cited by examiner

WHEN A TERMINAL DEVICE IS IN A SCREEN-OFF STATE AND A SCREEN UNLOCK PASSWORD INPUT BY A USER AND A TOUCH-PRESS OPERATION OF THE USER ON A FINGERPRINT IDENTIFICATION MODULE OF THE TERMINAL DEVICE ARE DETECTED, A PASSWORD MATCHING PROCESS IS PERFORMED ON THE SCREEN UNLOCK PASSWORD, SIMULTANEOUSLY AN INTERRUPT REQUEST IS TRIGGERED, AN ORIGINAL FINGERPRINT IMAGE IS ACQUIRED, AND A FINGERPRINT IDENTIFICATION PROCESS IS PERFORMED ON THE ORIGINAL FINGERPRINT IMAGE — 101

THE TERMINAL DEVICE LIGHTS UP THE SCREEN THEREOF, WHEN THE PASSWORD MATCHING PROCESS IS SUCCESSFUL AND THE FINGERPRINT IDENTIFICATION PROCESS IS SUCCESSFUL — 103

METHOD FOR CONTROLLING UNLOCKING AND TERMINAL DEVICE

CROSS-REFERENCE TO RELATED APPLICATION(S)

This application is continuation of U.S. Ser. No. 15/846,237, filed on Dec. 19, 2017, which is a continuation of International Application No. PCT/CN2016/087775, filed on Jun. 29, 2016, which claims priority to Chinese Patent Application No. 201610146753.2, filed on Mar. 14, 2016, the contents of all of which are hereby incorporated by reference in their entireties.

TECHNICAL FIELD

The present disclosure relates to the field of electronics, and particularly to a method for controlling unlocking and a terminal device.

BACKGROUND

Fingerprint identification technology has currently become a standard configuration of flagships of mainstream terminal devices (such as intelligent terminals, tablets, and the like). For sake of security, both fingerprint lock and screen lock are required in some conditions. When a user wants to unlock the terminal device, he or she is required to undergo fingerprint unlocking and screen unlocking respectively, and in this case, unlocking time equals to screen unlocking time and fingerprint unlocking time.

Recently, the unlocking time has become a highlight of product competitions of various manufacturers. How to optimize the unlocking time has become a technical problem to be solved in the field.

BRIEF DESCRIPTION OF THE DRAWINGS

In order to illustrate the technical solutions of implementations of the present disclosure more clearly, the drawings used in the implementations will be briefly described below. It will be apparent that the drawings described in the following are merely some implementations of the present disclosure, and it will be apparent to those skilled in the art that other drawings can be obtained from the drawings without any creative work.

DETAILED DESCRIPTION

Technical solutions of the implementations of the present disclosure will be described below clearly and completely in conjunction with the accompanying drawings of the implementations of the present disclosure. Obviously, the described implementations are merely some rather than all of the implementations of the present disclosure. On the basis of the implementations of the present disclosure, all other implementations obtained by any person skilled in the art without creative efforts shall fall within the protection scope of the present disclosure.

Here is a brief description of terms or phrases used herein.

Terms "first", "second", "third", "fourth" and the like referred to in the specification, claims, and drawings of the present disclosure are used to distinguish different objects rather than describe a specific order. In addition, terms "include", "comprise", "have" and any variations thereof are intended to cover anon-exclusive inclusion. For example, processes, methods, systems, products, or devices containing a series of operations or units are not limited to the listed operations or units, but may also optionally include other operations or units not listed, or optionally include other operations or units inherent to these processes, methods, products, or device.

"Implementation" involved herein means that specific features, structures, or characteristics described in connection with the implementations may be included in at least one implementation of the present disclosure. A phrase appearing at various locations in the specification does not necessarily refer to the same implementation or an independent or alternative implementation mutually exclusive from other implementations. Persons skilled in the art should explicitly and implicitly understand that the implementations described herein may be combined with other implementations.

In the following, some terms used in the implementations will be explained, for a better understanding of those skilled in the art.

Terminal device, also known as user equipment, is an apparatus that can provide voice and/or data connectivity for users, the apparatus can be a handheld device with a wireless connection function, an on-board device, and the like. A common terminal can include for example a phone, a tablet computer, a laptop computer, a palmtop computer, a mobile internet device (MID), or a wearable device, such as an intelligent watch, an intelligent bracelet, a pedometer, and so on.

The phrase "and/or" used herein refers to and encompasses any or all of the possible combinations of one or more associated listed items. For example, for the purpose of the present disclosure, the phrases "A and/or B" and "A or B" mean (A), (B), or (A and B).

The term "module" or "unit" may be used to refer to one or more physical or logical components or elements of a system. In some implementations, a unit may be a distinct circuit, while in other implementations a unit may include a plurality of circuits.

The term "registered fingerprint template" means that, when a fingerprint function of a terminal device such as a mobile phone is enabled for the first time, the user may be asked to undergo a fingerprint registration process. During the fingerprint registration, the user may put his or her finger on a fingerprint identification module (also known as fingerprint identification sensor, fingerprint sensor, fingerprint recognizer, and the like) for fingerprint image acquisition, and the fingerprint image received or acquired will be stored as a registered fingerprint template. Usually, one finger corresponds to one fingerprint template, sometimes, one finger can have more than one fingerprint template stored in the terminal. Generally, the fingerprint identification module may receive 10-20 times for each finger in order to receive the whole fingerprint face and generate a comprehensive registered fingerprint template. Characteristic information can be obtained from the fingerprint image received, and for example, the fingerprint template can be saved in the form of an image.

Implementations of the present disclosure will be described in detail below

In the related art, a mobile terminal is generally equipped with fingerprint unlock function ("fingerprint unlock" for short) and screen unlock function ("screen unlock" for short) for security. When unlocking the mobile terminal, the fingerprint unlock and screen unlock are conducted successively. In other words, the fingerprint unlock is conducted after the screen unlock, or the screen unlock is conducted after the fingerprint unlock. In order to shorten the unlocking time of the terminal device, in implementations of the present disclosure, in a screen-off state, the fingerprint unlock and the screen unlock are conducted in parallel. As such, the unlocking speed of the terminal can be improved, and a running speed of a processor of the terminal can be improved either.

Figure 1A:
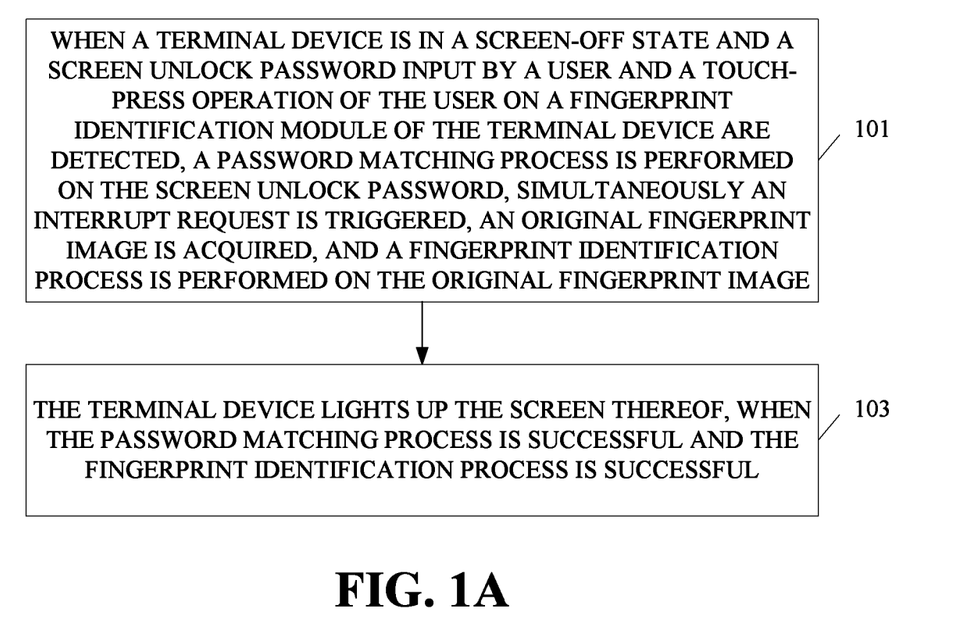
FIG. 1A and FIG. 1B are schematic diagrams illustrating an unlocking control method according to an implementation of the present disclosure.
Figure 1B:
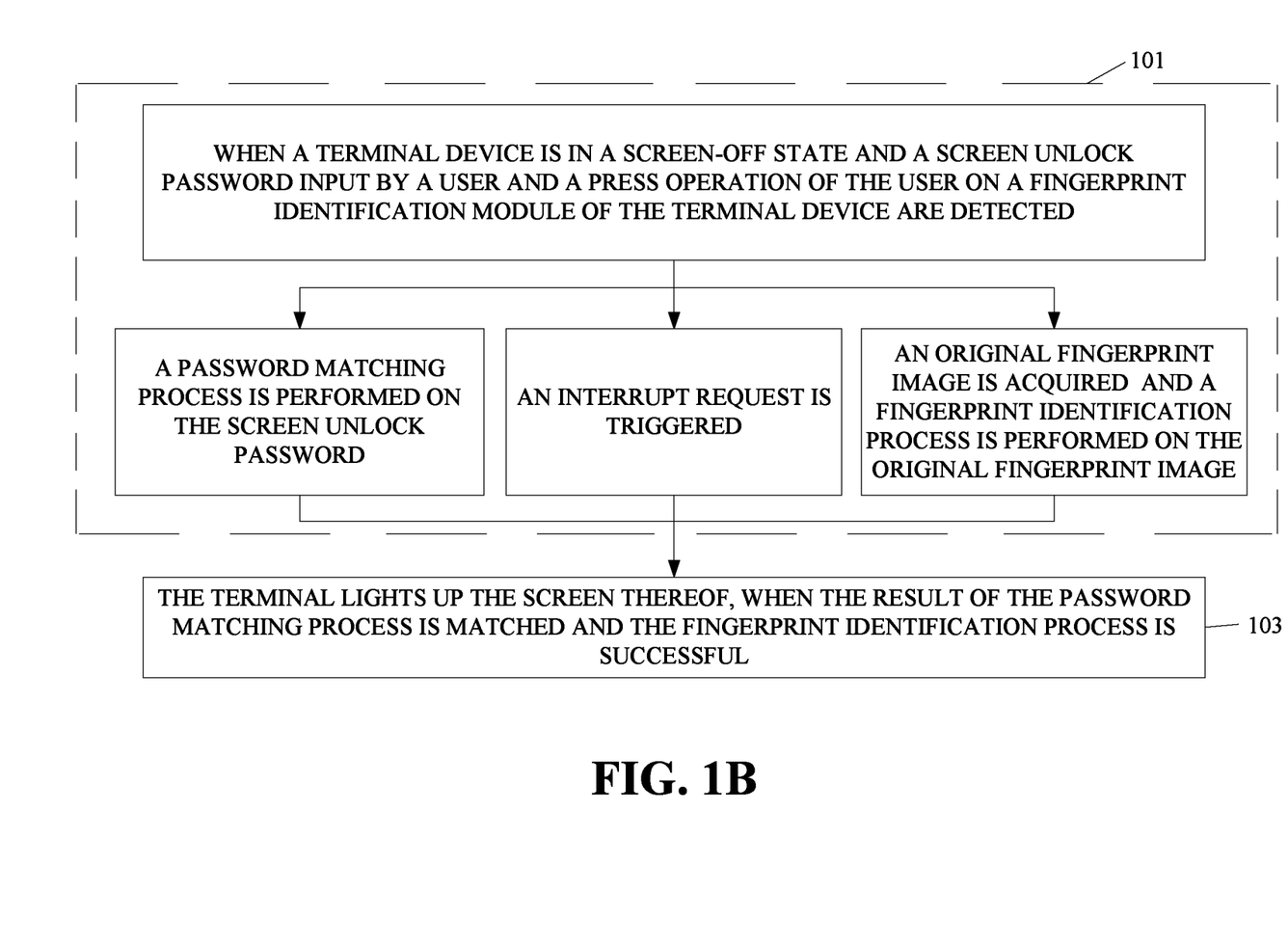

FIG. 1A and FIG. 1B are schematic diagrams illustrating an unlocking control method according to an implementation of the present disclosure. The unlocking control method described in the implementation of the present disclosure can begin at block 101.

At block 101, when a terminal device is in a screen-off state and a screen unlock password input by a user and a touch-press operation (in other words, a press operation) of the user on a fingerprint identification module of the terminal device are detected, a password matching process is performed on the screen unlock password (that is, screen unlock process) and simultaneously, an interrupt request is triggered, an original fingerprint image is acquired, and a fingerprint identification process is performed on the original fingerprint image (that is, fingerprint unlock process). For example, in one implementation, the screen unlock password is a graphic unlock password, when W registered graphic unlock passwords are pre-stored, where W is an integer greater than 1, the performing a password matching process on a screen unlock pass word includes the follows. The number of times that the W registered graphic unlock passwords are matched within a preset time period is acquired; the W registered graphic unlock passwords are ranked in a descending order according to the number of times that the W registered graphic unlock passwords are matched within the preset time period; the graphic unlock password is matched with the ranked W registered graphic unlock passwords sequentially. Although the screen unlock process and fingerprint unlock process are sequentially illustrated in FIG. 1B for ease of understanding, the two are executed in parallel.

As mentioned above, in some platform chips, taking security mechanism into consideration, systems are generally equipped with fingerprint unlock and screen unlock. Currently, the fingerprint unlock is performed after the screen unlock, or the screen unlock is performed after the fingerprint unlock. In other words, the fingerprint unlock and the screen unlock are performed successively (or sequentially) rather than performed in parallel, that is, the screen unlock cannot begin until the fingerprint unlock is completed (for example, successful), or the fingerprint unlock cannot begin until the screen unlock is completed.

In at least one implementation of the present disclosure, the screen unlock is performed first, and the fingerprint unlock is performed in the process of the screen unlock. Since the fingerprint unlock takes a longer time than the screen unlock, the unlocking time can be regarded as a short screen unlocking time plus fingerprint unlocking time, as such, the unlocking time of the terminal device can be shortened.

As one implementation, when the terminal device is in the screen-off state and the screen unlock password input by the user is detected, the terminal performs the password matching process on the screen unlock password. In the process of performing the password matching process on the screen unlock password, when the press operation of the user on the fingerprint identification module of the terminal device is detected, the terminal device triggers the interrupt request, acquires the original fingerprint image, and performs the fingerprint identification process on the original fingerprint image. As one implementation, the process that the terminal device triggers the interrupt request, acquires the original fingerprint image, and performs the fingerprint identification process on the original fingerprint image can be achieved via a current procedure, that is, press-to-interrupt—finger touch—fingerprint image acquisition—fingerprint identification—unlocking and lighting up (in other words, waking up) the screen; or the current procedure can be divided into two processes, one process is: finger touch—fingerprint image acquisition—fingerprint identification—unlocking, and the other process is: press-to-interrupt—waiting for lighting up the screen. These two processes can be performed in parallel. When the press-to-interrupt is completed and the result of the fingerprint identification is matched, the screen of the terminal device is lit up.

In terms of the fingerprint identification process of the original fingerprint image, the fingerprint unlock can be divided into two processes. One process is: finger touch—fingerprint image acquisition—fingerprint identification—unlocking; the other process is: press-to-interrupt. These two processes can be performed in parallel. When the press-to-interrupt is completed and the result of the fingerprint identification is matched, the screen of the terminal device will be lit up. Compared with the current process, that is, press-to-interrupt—finger touch—fingerprint image acquisition—fingerprint identification—unlocking and lighting up the screen, the fingerprint unlocking manner according to implementations of the present disclosure only needs to count the fingerprint unlocking time 100 ms, the time 60-100 ms spent on the press-to-interrupt may not be counted, press-to-unlock time of the terminal in the screen-off state can be shorted, and the unlocking time of the terminal device can also be shorted.

At block 103, the terminal device lights up the screen thereof, when the password matching process is successful (in other word, the result of the password matching process is matched) and the fingerprint identification process is successful and the fingerprint identification process is successful.

Password Matching Process

Figure 2:
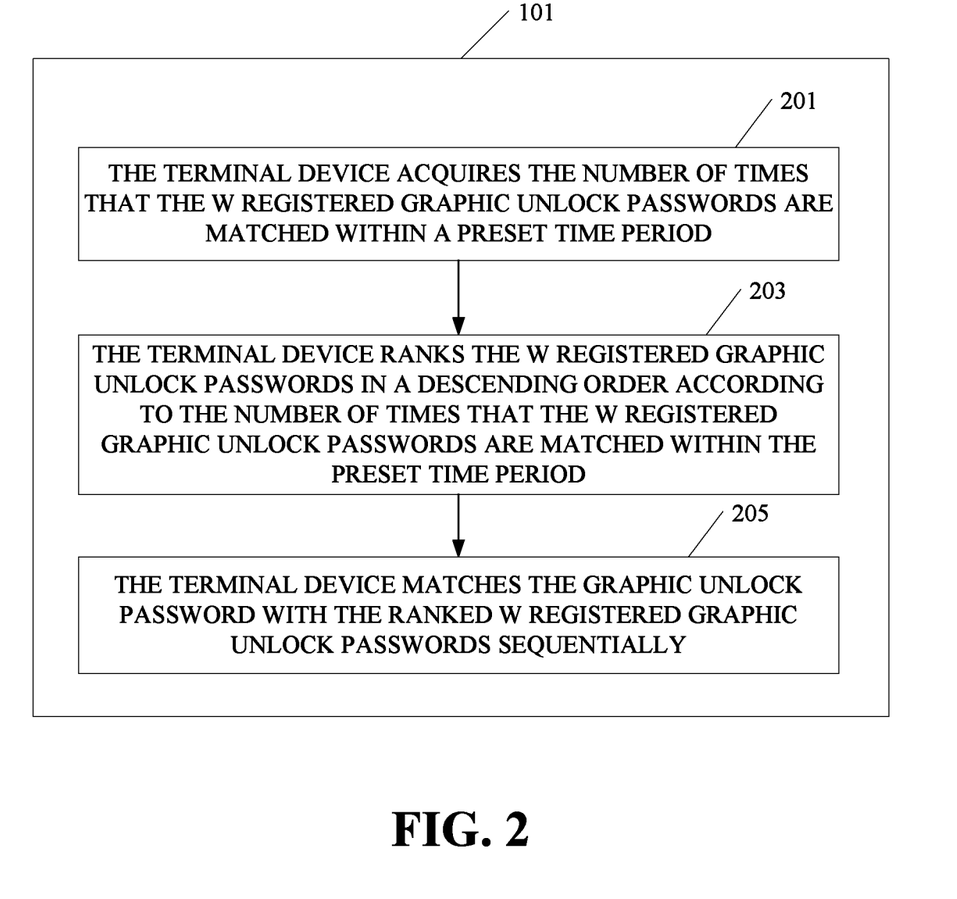
FIG. 2 is a schematic diagram illustrating a password matching process of a screen unlock password according to an implementation of the present disclosure.

The following describes a graphic unlock password as an example of the screen unlock password, the number of registered graphic unlock passwords pre-stored in a terminal is W, W is an integer greater than 1. As illustrated in FIG. 2, the process of performing the password matching process on the screen unlock password at block 101 can be achieved as follows.

At block 201, the terminal device acquires the number of times that the W registered graphic unlock passwords are matched within a preset time period.

At block 203, the terminal device ranks the W registered graphic unlock passwords in a descending order according to the number of times that the W registered graphic unlock passwords are matched within the preset time period.

At block 205, the terminal device matches the graphic unlock password with the ranked W registered graphic unlock passwords sequentially.

In one implementation, the screen unlock password is a graphic unlock password, the number of the registered graphic unlock passwords is W, and W is an integer greater than 1. In order to further shorten the unlocking time, the terminal device may rank the W registered graphic unlock passwords according to the number of times that the W registered graphic unlock passwords are matched within the preset time period or according to the registered priorities of the W registered graphic unlock passwords. The followings are described in detail.

Example 1

In one implementation, the terminal device first acquires the number of times that the W registered graphic unlock passwords are matched within the preset time period (such as one week), then the terminal device ranks the W registered graphic unlock passwords in a descending order according to the number of times that the W registered graphic unlock passwords are matched within the preset time period (for example, the registered graphic unlock passwords include a registered graphic unlock password 1, a registered graphic unlock password 2, and a registered graphic unlock password 3, among which the registered graphic unlock password 1 is matched 100 times within one week, the registered graphic unlock password 2 is matched 10 times within one week, and the registered graphic unlock password 3 is matched 5 times within one week, then the ranked order is: the registered graphic unlock password 1, the registered graphic unlock password 2, and the registered graphic unlock password 3), finally the terminal device matches the graphic unlock password with the ranked W registered graphic unlock passwords sequentially (for example, match the graphic unlock password with the registered graphic unlock password 1 first, if the match is successful, the matching process is completed; otherwise, if the match fails, match the graphic unlock password with the registered graphic unlock password 2, and so on).

Example 2

In one implementation, the terminal device may first acquires registered priorities of the W registered graphic unlock passwords, and then ranks the W registered graphic unlock passwords according to the registered priorities thereof (for example, the registered graphic unlock passwords include a registered graphic unlock password 1, a registered graphic unlock password 2, and a registered graphic unlock password 3; the registered priority of the registered graphic unlock password 1 is level 1, the registered priority of the registered graphic unlock password 2 is level 2, and the registered priority of the registered graphic unlock password 3 is level 3, wherein level 1 is greater than level 2, and level 2 is greater than level 3, that is, level 1>level 2>level 3, then the ranked order is: the registered graphic unlock password 1, the registered graphic unlock password 2, and the registered graphic unlock password 3), finally the terminal device matches the graphic unlock password with the ranked W registered graphic unlock passwords sequentially (for example, match the graphic unlock password with the registered graphic unlock password 1 first, if the match is successful, the matching process is completed; otherwise, if the match fails, match the graphic unlock password with the registered graphic unlock password 2, and so on).

What needs to be explained is, in implementations of the present disclosure, the screen unlock password can also include a digital password, a track password, a fingerprint password, and the like, and the present disclosure is not limited thereto.

Fingerprint Identification Process

Figure 3:
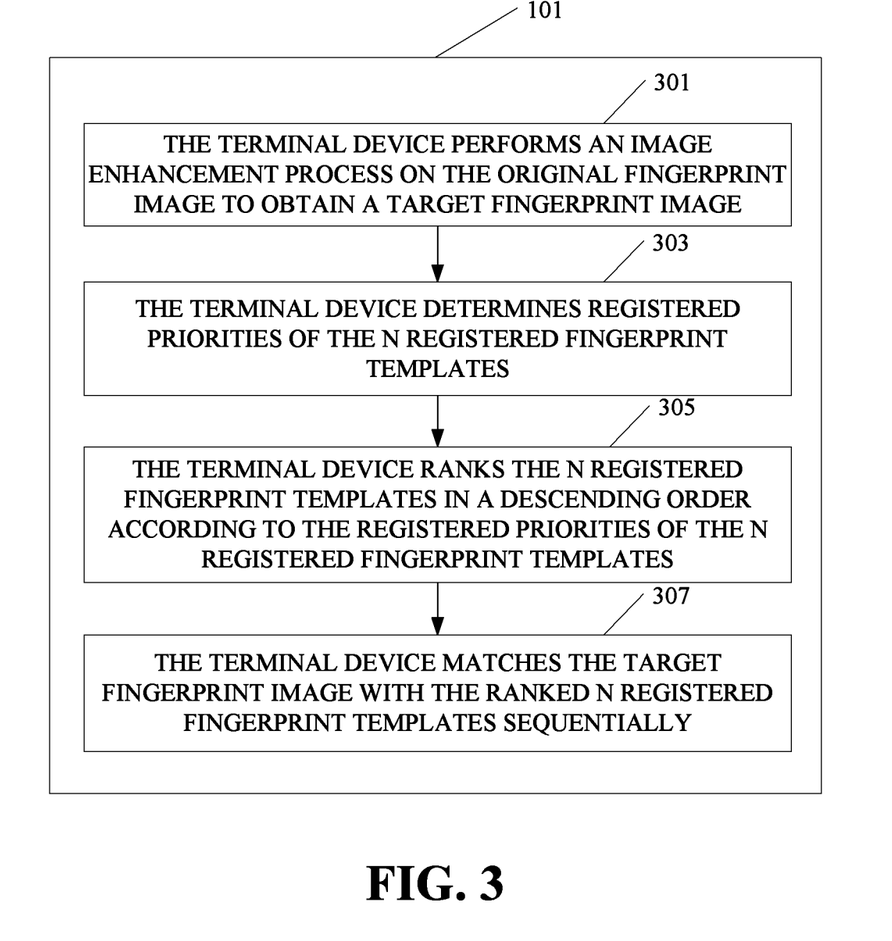
FIG. 3 is a schematic diagram illustrating a fingerprint identification process of an original fingerprint image according to an implementation of the present disclosure.

The number of registered fingerprint templates pre-stored in a terminal is N for example, and N is an integer greater than 1. As illustrated in FIG. 3, the process of performing the fingerprint identification process on the original fingerprint image at block 101 can be as follows.

At block 301, the terminal device performs an image enhancement process on the original fingerprint image to obtain a target fingerprint image.

At block 303, the terminal device determines registered priorities of the N registered fingerprint templates.

At block 305, the terminal device ranks the N registered fingerprint templates in a descending order according to the registered priorities of the N registered fingerprint templates.

At block 307, the terminal device matches the target fingerprint image with the ranked N registered fingerprint templates sequentially.

Specifically, in order to reduce a false rejection rate (FRR) or increase a false accept rate (FAR), before performing the fingerprint identification process, the terminal device needs to perform the image enhancement process on the original fingerprint image to obtain the target fingerprint image. FRR refers to an error probability when same fingerprints are regarded as different and rejected, FRR=(the number of fingerprints that are false rejected/the total number of fingerprints investigated)*100%). FAR refers to an error probability when different fingerprints are regarded as the same and accepted, FRR=(the number of fingerprints that are false accepted/the total number of fingerprints investigated) *100%).

In one implementation, the number of the registered fingerprint templates of the terminal device is N. In order to increase the speed of fingerprint identification, the terminal device can first rank the N registered fingerprint templates based on priority thereof, which can be achieved as follows: the terminal device first acquires priorities of the N registered fingerprint templates set when registered, in a descending order of the priorities of the N registered fingerprint templates set when registered (the priorities include priority 1, priority 2, and priority 3, the level of the priority 1 is greater than the level of the priority 2, and the level of the priority 2 is greater than the level of the priority 3, and so on), the terminal device ranks the N registered fingerprint templates (for example, the registered fingerprint templates include a fingerprint template 1, a fingerprint template 2, and a fingerprint template 3, the fingerprint template 1 corresponds to the priority 1, the fingerprint template 2 corresponds to the priority 2, and the fingerprint template 3 corresponds to the priority 3, the ranked order is: the fingerprint template 1, the fingerprint template 2, the fingerprint template 3), finally the terminal device matches the target fingerprint image with the ranked N registered fingerprint templates sequentially (for example, match the target fingerprint image with the fingerprint template 1 first, when the match is successful, the matching process is completed; otherwise, if the match fails, match the target fingerprint image with the fingerprint template 2, and so on). The terminal device can judge whether the fingerprint identification is matched successfully as follows: when a proportion that the target fingerprint image matches feature points of the registered fingerprint templates is greater than or equal to a pre-set threshold, the match is successful; when the proportion that the target fingerprint image matches the feature points of the registered fingerprint templates is smaller than a pre-set threshold, the match fails. For example, the pre-set threshold can be equal to 50%, 60%, 70%, 80% and other values.

The unlocking control method illustrated in FIG. 1 and FIG. 1.1 can also include the follows after the screen of the terminal device is lit up.

The terminal device detects whether there is an application bound with the screen unlock password. When there is an application bound with the screen unlock password, the terminal device enables the application bound with the screen unlock password.

In order to allow the user to access the application that he or she wants to open directly after lighting up the screen of the terminal device, the user can bind the screen unlock password with a corresponding application in advance. When the terminal device verifies that the screen unlock password matches, the terminal device detects whether there is an application bound with the screen unlock password. If yes, the terminal device will enable the application bound with the screen unlock password. The interface that the terminal device displays after the terminal device enables the application bound with the screen unlock password can be an interface that the application is enabled last time, a main interface of the application, or an interface of the application that the user often browses, and the present disclosure is not limited thereto.

At block 103 mentioned above, the screen of the terminal device can be lit up as follows: the terminal device acquires current environmental brightness and lights up the screen of the terminal device according to the current environmental brightness.

Common terminal devices are generally equipped with an automatic screen brightness adjustment in order to protect eyes. When the terminal device opens the automatic light-sensing function, the terminal device first acquires the current environmental brightness via an optical sensor, and then determines target screen brightness corresponding to the current environmental brightness according to a correspondence between light brightness and screen brightness. Finally, the terminal device lights up the screen of the terminal device according to the target screen brightness, so as to enhance user experience and protect eyes of the user.

As can be seen, in implementations of the present disclosure, the screen-off press-to-unlock procedure is divided into two actions which are performed in parallel, that is, the screen unlock and the fingerprint unlock. Compared with a traditional screen-off press-to-unlock, the screen-off press-to-unlock in the implementation of the present disclosure can shorten press-to-unlock time of the terminal in the screen-off state, thereby enhancing user experience.

The apparatus configured to implement the above method in the implementations of the present disclosure will be described below in conjunction with the accompanying drawings.

Figure 4A:
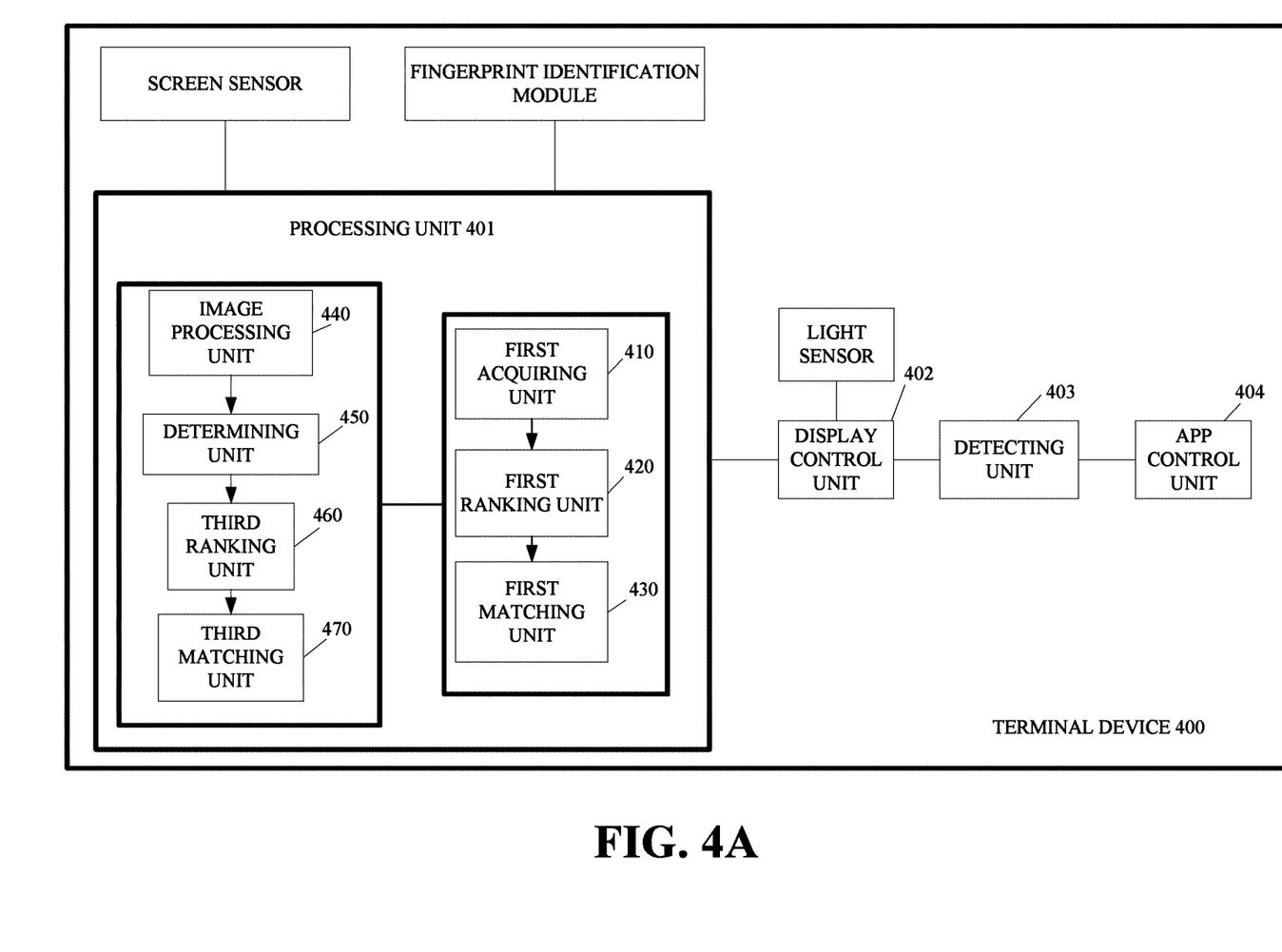
FIG. 4A is a structural schematic diagram illustrating a terminal device according to an implementation of the present disclosure.

FIG. 4 is a structural schematic diagram illustrating a terminal device according to an implementation of the present disclosure.

As illustrated in FIG. 4A, a terminal device 400 can include a processing unit 401 and a display control unit 402.

The processing unit 401 can be a processor, a circuit, or control components coupled to or integrated in the processor. The display control unit 402 can be a display controller for example. The processing unit 401 and the display control unit 402 can be disposed integrally or separately.

The processing unit 401 is configured to perform a password matching process on a screen unlock password, simultaneously trigger an interrupt request, acquire an original fingerprint image, and perform a fingerprint identification process on the original fingerprint image, when the terminal device is in a screen-off state and the screen unlock password input by a user and a press operation of the user on a fingerprint identification module of the terminal device are detected. The original fingerprint image can be acquired or received through a fingerprint identification module. The processing unit 401 can be integrated with the fingerprint identification module. Or, the processing unit 401 can be separated from the fingerprint identification module. The screen unlock password can be acquired via a screen sensor of the terminal device.

The display control unit 402 is configured to light up a screen of the terminal device, when the password matching process is matched and the fingerprint identification process is successful.

In some implementations, the terminal device may further include a light sensor. The display control unit 402 is further configured to acquire current environmental brightness and light up the screen of the terminal device according to the current environmental brightness detected by the light sensor. The display control unit 402 can be coupled with the light sensor.

In some implementations, the screen unlock password is a graphic unlock password, the number of registered graphic unlock passwords is W, W is an integer greater than 1.

Based on this, in order to achieve screen unlock, as illustrated in FIG. 4A, the processing unit 401 can include a first acquiring unit 410 (such as a processor or a logical circuit), a first ranking unit 420 (such as a processor or a logical circuit), and a first matching unit 430 (such as a processor or a logical circuit).

The first acquiring unit 410 is configured to acquire the number of times that the W registered graphic unlock passwords are matched within a preset time period.

The first ranking unit 420 is configured to rank the W registered graphic unlock passwords in a descending order according to the number of times that the W registered graphic unlock passwords are matched within the preset time period.

The first matching unit 430 is configured to match the graphic unlock password with the ranked W registered graphic unlock passwords sequentially.

In the foregoing example, the processing unit is configured to conduct screen unlock based on the number of times of matching of the graphic unlock passwords, alternatively, the processing unit can still be configured to conduct screen unlock based on registered priority of the graphic unlock passwords, and a corresponding structure of the processing unit is given below.

Figure 4B:
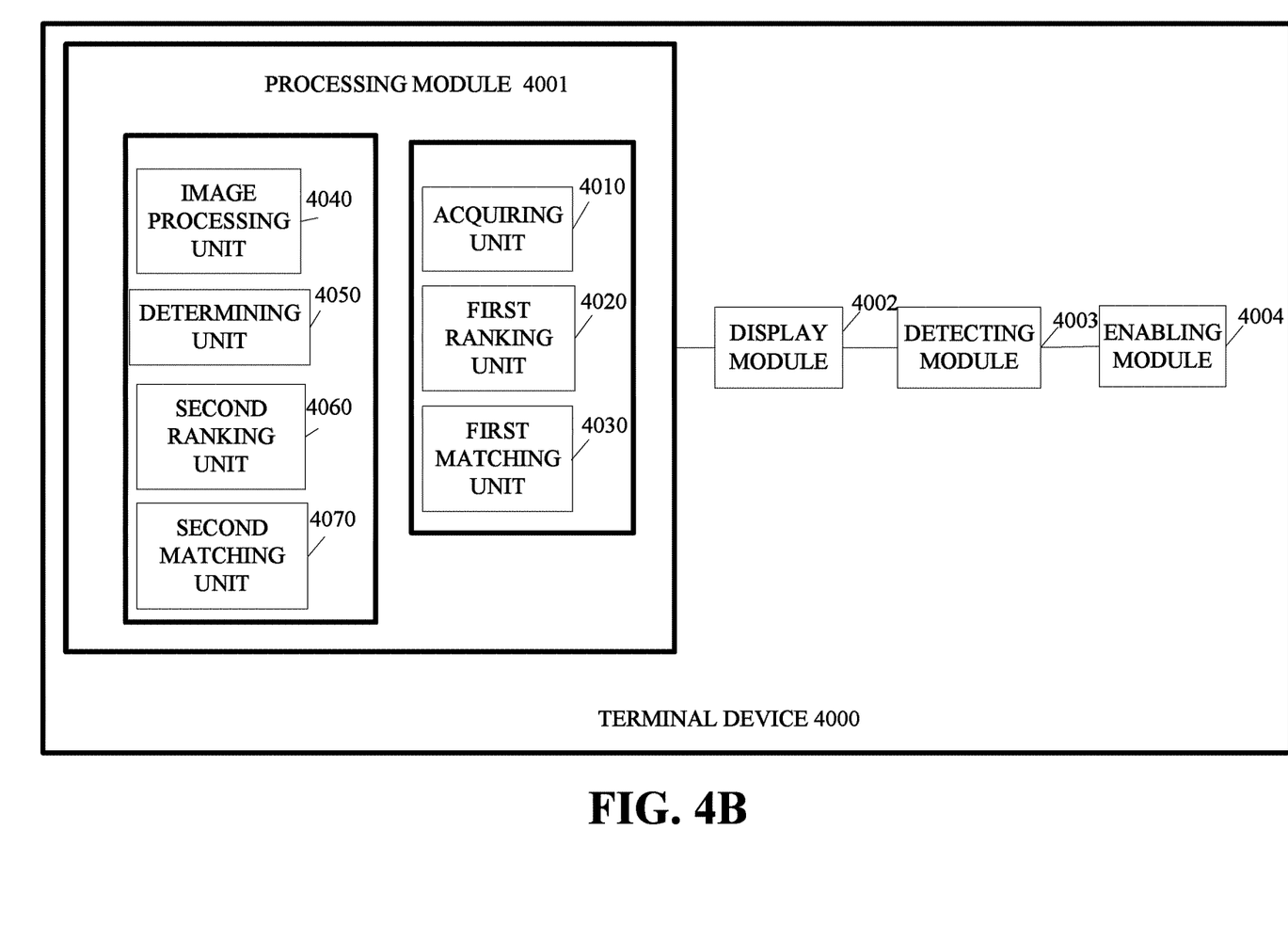
FIG. 4B is a structural schematic diagram illustrating another terminal device according to an implementation of the present disclosure.

FIG. 4B is a structural schematic diagram illustrating another terminal device according to an implementation of the present disclosure. As illustrated in FIG. 4B, a terminal device 4000 can include a processing module 4001, a display module 4002, a detecting module 4003, and an enabling module 4004.

The processing module 4001 is configured to perform a password matching process on a screen unlock password, trigger an interrupt request and acquire an original fingerprint image, and perform a fingerprint identification process on the original fingerprint image, when the terminal device is in a screen-off state and the screen unlock password input by a user and a touch-press operation of the user on a fingerprint identification module of the terminal device are detected. The processing module 4001 can be implemented through a fingerprint sensor for example.

The display module 4002 is configured to light up a screen of the terminal device, when the password matching process is successful and the fingerprint identification process is successful. The display module 4002 is configured to acquire current environmental brightness, and light up the screen of the terminal device according to the current environmental brightness. The display module 4002 can be implemented through a controller coupled with a display and the fingerprint sensor.

For example, in one implementation, the screen unlock password is a graphic unlock password, W registered graphic unlock passwords are pre-stored, W is an integer greater than 1, and the processing module 4001 may include an acquiring unit 4010, a first ranking unit 4020, and a first matching unit 4030. The acquiring unit 4010 is configured to acquire the number of times that the W registered graphic unlock passwords are matched within a preset time period. The first ranking unit 4020 is configured to rank the W registered graphic unlock passwords in a descending order according to the number of times that the W registered graphic unlock passwords are matched within the preset time period. The first matching unit 4030 is configured to match the graphic unlock password with the ranked W registered graphic unlock passwords sequentially. The acquiring unit 4010 can be a reader coupled with a memory and can access the memory for information. The first ranking unit 4020 is a controller or a digital logic circuit for example. The first matching unit 4030 can be a comparator.

The detecting module 4003 is configured to detect whether there is an application bound with the screen unlock password. The detecting module 4003 can be a detector or logic circuit.

The enabling module 4004 is configured to enable the application bound with the screen unlock password based on a determination that there is an application bound with the screen unlock password. The enabling module 4004 can be a controller or reader.

For example, in another implementation, N registered fingerprint templates are pre-stored in a memory for example, where W is an integer greater than 1, and the processing module 4001 may include an image processing unit 4040, a determining unit 4050, a second ranking unit 4060, and a second matching unit 4070. The image processing unit 4040 is configured to perform an image enhancement process on the original fingerprint image to obtain a target fingerprint image. The determining unit 4050 is configured to determine registration priorities of the N registered fingerprint templates. The second ranking unit 4060 is configured to rank the N registered fingerprint templates in a descending order according to the registration priorities of the N registered fingerprint templates. The second matching unit 4070 is configured to match the target fingerprint image with the ranked N registered fingerprint templates sequentially. The image processing unit 4040 can be an image/picture processor for example.

Figure 5:
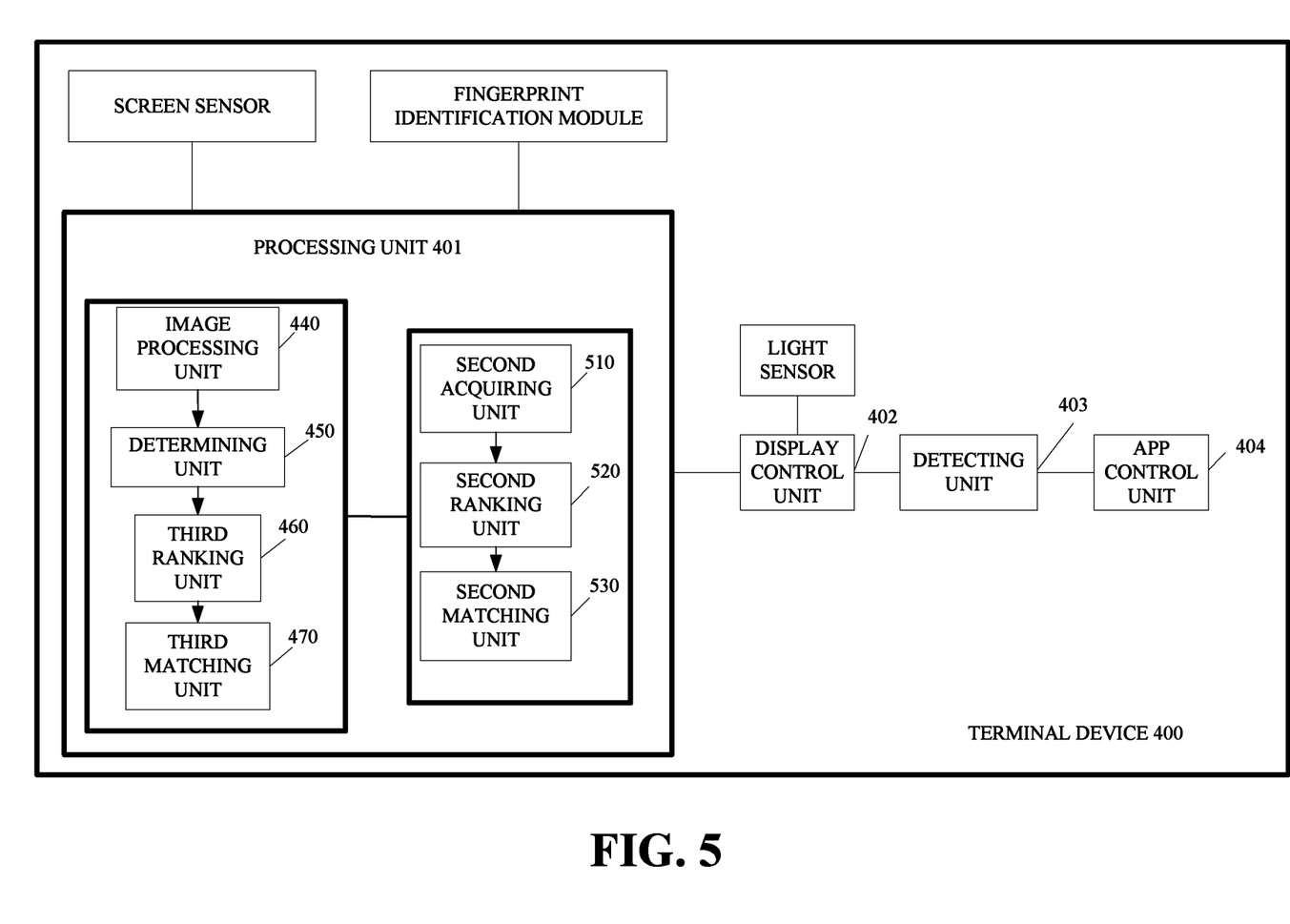
FIG. 5 is a structural schematic diagram illustrating a terminal device according to an implementation of the present disclosure.

As illustrated in FIG. 5, the processing unit 401 can include a second acquiring unit 510 (such as a processor or a logical circuit), a second ranking unit 520 (such as a processor or a logical circuit), and a second matching unit 530 (such as a processor or a logical circuit).

The second acquiring unit 510 is configured to acquire registered priorities of the W registered graphic unlock passwords.

The second ranking unit 520 is configured to rank the W registered graphic unlock passwords according to the registered priorities of the W registered graphic unlock passwords.

The second matching unit 530 is configured to match the graphic unlock password with the ranked W registered graphic unlock passwords sequentially.

Although the first acquiring unit 410, the first ranking unit 420, the first matching unit 430 and the second acquiring unit 510, the second ranking unit 520, the second matching unit 530 are illustrated in two figures respectively, the components with the same or similar functions can be integrated into one component. For example, the first acquiring unit 410 and the second acquiring unit 510 can be arranged as one acquiring unit.

In some implementations, the number of registered fingerprint templates is N, N is an integer greater than 1.

Based on this, in order to achieve fingerprint unlock, as illustrated in FIG. 4A or FIG. 5, the processing unit 401 can include an image processing unit 440 (such as an image processor or a logical circuit), a determining unit 450 (such as a processor, a comparator, a reader, or a logical circuit), a third ranking unit 460 (such as a processor or a logical circuit), and a third matching unit 470 (such as a processor or a logical circuit).

The image processing unit 440 is configured to perform an image enhancement process on the original fingerprint image to obtain a target fingerprint image.

The determining unit 450 is configured to determine registered priorities of the N registered fingerprint templates. For example, the registered priorities can be stored in a memory in advance; the determining unit 450 can access the memory for priority data.

The third ranking unit 460 is configured to rank the N registered fingerprint templates in a descending order according to the registered priorities of the N registered fingerprint templates.

The third matching unit 470 is configured to match the target fingerprint image with the ranked N registered fingerprint templates sequentially.

In some implementations, the terminal device illustrated in FIG. 4A can further include a detecting unit 403 (such as a detector, processor, or a logical circuit) and an application control unit 404 (such as an application controller, or a logical circuit).

When the display control unit 402 lights up the screen of the terminal device based on a termination that the password matching process is matched and the fingerprint identification process is successful, the detecting unit 403 is configured to detect an application bound with the screen unlock password, and the application control unit 404 is configured to enable the application bound with the screen unlock password.

What needs to be explained is, these above modules (the processing unit 401, the display control unit 402, the detecting unit 403, and the application control unit 404) are configured to implement corresponding steps in the above method.

In the implementations of the present disclosure, the units or modules can refer an application-specific integrated circuit (ASIC), a processor, a memory configured to implement one or more software or hardware programs, an integrated logical circuit, and/or other devices that can provide above functions. In addition, the processing unit 401, the display control unit 402, the detecting unit 403, and the application control unit 404 can be implemented via the processor of the terminal device illustrated in FIG. 6.

Figure 6:
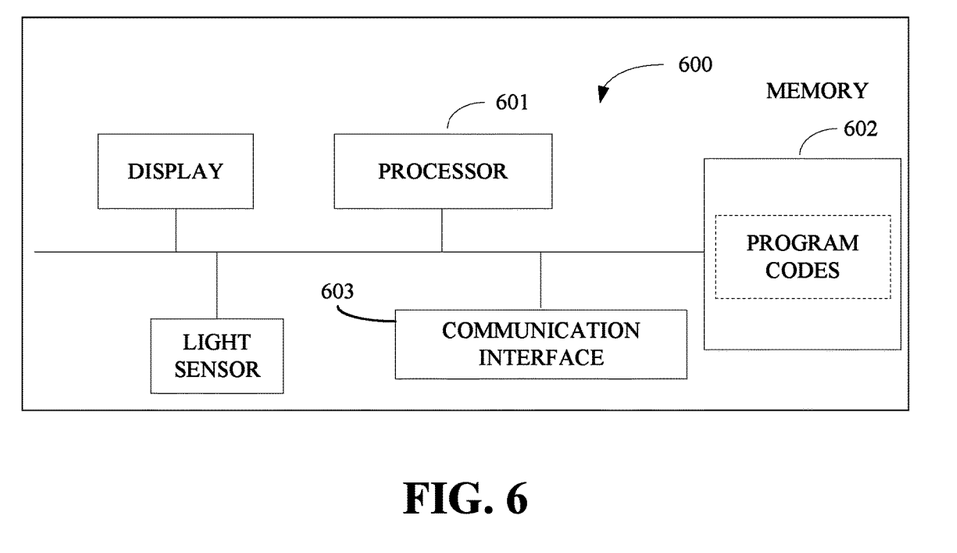
FIG. 6 is a structural schematic diagram illustrating another terminal device according to an implementation of the present disclosure.

Referring to FIG. 6, FIG. 6 is a structural schematic diagram illustrating another terminal device according to an implementation of the present disclosure. As illustrated in FIG. 6, the terminal device can include at least one processor 601, at least one memory 602, and at least one communication interface 603. In addition, the terminal device can also include fingerprint identification modules, and the fingerprint identification modules are configured to acquire fingerprint image of the user. The terminal device can also include an antenna and other universal parts and it will not repeat here.

The processor 601 can be a central processing unit (CPU), a microprocessor, an ASIC, or one or more integrated circuits configured to control implementation of above solution programs.

The communication interface 603 is configured to communicate with other devices or communication networks, such as Ethernet, radio access networks (RAN), wireless local area networks (WLAN) and the like.

The memory 602 can be a read-only memory and other kinds of static storage devices that can store static information and instructions, a random access memory (RAM) and other kinds of dynamic storage devices that can store static information and instructions, an electrically erasable programmable read-only memory (EEPROM), a compact disc read-only memory (CD-ROM) and other compact disc memory, an optical disk memory (including a compressing disc, a laser disc, an optical disk, a digital universal disk, a blue-ray disc and the like), disk storage medium, or other magnetic storage medium, or any other medium that can be configured to carry or store expected program codes in a form of instructions or data instructions and can be accessed by the computer, and the present disclosure is not limited thereto. The memory can exist independently and be connected with the processor via a bus. The memory and the processor can be integrated together.

The memory 602 is configured to store application program codes which implement the above solutions and are controlled to implement by the processor 601. The processor 601 is configured to implement the application program codes stored in the memory 602.

As for the terminal device illustrated in FIG. 6, program codes stored in the memory 602 can implement the unlocking control method of the terminal device provided above. For example, when the terminal device is in a screen-off state and the screen unlock password input by a user is detected, the terminal device performs a password matching process on a screen unlock password; when a press operation of the user on a fingerprint identification module of the terminal device is detected simultaneously, the terminal device triggers an interrupt request, acquires an original fingerprint image, and performs a fingerprint identification process on the original fingerprint image. When the password matching process is matched and the fingerprint identification process is successful, the terminal device lights up a screen of the terminal device.

The implementations of the present disclosure also provide a computer storage medium. The computer storage medium may store a program, and the program executes some or all of the steps of any one unlocking control method in the method implementation.

What needs to be explained is, for each of the aforementioned method implementation, for the sake of simplicity, it is generally described as a combination of a series of actions; however, those skilled in the art should know that the present disclosure is not restricted by the sequence of the actions described. Based on the present disclosure, some steps can be conducted in other sequences or simultaneously. Those skilled in the art should know that the implementations described herein are exemplary implementations, actions and units/modules involved may not be necessary for the present disclosure.

It will be understood by those of ordinary skill in the art that, implementation of all or part of the processes in the method of the implementations described above can be accomplished by a computer program to instruct the associated hardware; the computer program can be stored in a computer-readable storage medium. The storage medium can be a flash disk, a read-only memory (ROM), a random access memory (RAM), a magnetic disk, an optical disk, or the like.

In the above-mentioned implementations, the descriptions of various implementations each have a focus, and portions not detailed in one implementation can refer to a relevant description of the other implementations.

Among the implementations provided in the present disclosure, it should be understood that, the apparatus disclosed can be implemented in other ways. For example, the above-mentioned apparatus implementations are only schematic; for example, the division of the above-mentioned units is only a division of logic function, and other ways of division can be adopted when implemented. For example, a plurality of units or assemblies can be combined or integrated into another system, or some features can be omitted or not implemented. Mutual coupling, direct coupling, or communication connection displayed or discussed herein can be an indirect coupling or communication connection through some interfaces, devices, or units, and can be electrical or other forms.

The above-mentioned units illustrated as separate components may be or may not be separated physically, components displayed as units may be or may not be physical units and can be located in one place or distributed over a plurality of network units. Part of or all of the units can be chosen according to actual needs to achieve aims of solutions of the present disclosure.

Besides, each functional unit in implementations of the present disclosure can be integrated into a processing unit, or each functional unit can exist individually and physically, or two or more units can be integrated into a unit. The above-mentioned integrated units can be implemented in the form of software functional units or hardware.

If the above-mentioned integrated units are implemented in the form of software functional units and are sold or used as independent products, they can be stored in a computer readable storage medium. Based on this understanding, parts of the technical solutions of the present disclosure that make a contribution to the related art or all or part of the technical solutions can be embodied in the form of software products. The computer software products can be stored in a storage medium, including one or more instructions for causing computer equipment (such as a personal computer, a server, a network device, and the like, and specifically, a processor of the computer equipment) to implement all or part of steps of the above-mentioned methods of the implementations of the present disclosure. The above-mentioned storage medium can include: USB flash disk, mobile disk, disk, Compact Disc (CD), Read-Only Memory (ROM) or Random Access Memory (RAM) and all kinds of medium that can store program codes.

The foregoing disclosed is merely exemplary implementations and it is not intended to limit the scope of the present disclosure; equivalents changes made on the basis of the claims of the present disclosure shall fall into the scope of the present disclosure.

What is claimed is:

1. A method for controlling unlocking, comprising:
performing a password matching process on a screen unlock password, triggering an interrupt request and acquiring an original fingerprint image, and performing a fingerprint identification process on the original fingerprint image, when a terminal device is in a screen-off state and the screen unlock password input by a user and a touch-press operation of the user on a fingerprint identification module of the terminal device are detected; wherein, the password matching process and the fingerprint identification process are performed sequentially or performed in parallel; and
lighting up a screen of the terminal device, when the password matching process is successful and the fingerprint identification process is successful;
wherein the screen unlock password is a graphic unlock password, performing the password matching process on the screen unlock password comprises the following when W registered graphic unlock passwords are pre-stored, W being an integer greater than 1:
acquiring the number of times that the W registered graphic unlock passwords are matched within a preset time period;
ranking the W registered graphic unlock passwords in a descending order according to the number of times that the W registered graphic unlock passwords are matched within the preset time period; and
matching the graphic unlock password with the ranked W registered graphic unlock passwords sequentially.

2. The method of claim 1, further comprising the following after the lighting up a screen of the terminal device:
detecting whether there is an application bound with the screen unlock password; and
enabling the application bound with the screen unlock password based on a determination that there is an application bound with the screen unlock password.

3. The method of claim 1, wherein N registered fingerprint templates are pre-stored, N is an integer greater than 1, and the performing a fingerprint identification process on the original fingerprint image comprises:
performing an image enhancement process on the original fingerprint image to obtain a target fingerprint image;
determining registration priorities of the N registered fingerprint templates;
ranking the N registered fingerprint templates in a descending order according to the registration priorities of the N registered fingerprint templates; and
matching the target fingerprint image with the ranked N registered fingerprint templates sequentially.

4. The method of claim 3, wherein the lighting up a screen of the terminal device comprises:
acquiring current environmental brightness, and lighting up the screen of the terminal device according to the current environmental brightness.

5. The method of claim 1, wherein the lighting up a screen of the terminal device comprises:
acquiring current environmental brightness, and lighting up the screen of the terminal device according to the current environmental brightness.

6. A terminal device, comprising:
a processing module, configured to perform a password matching process on a screen unlock password, trigger an interrupt request and acquire an original fingerprint image, and perform a fingerprint identification process on the original fingerprint image, when the terminal device is in a screen-off state and the screen unlock password input by a user and a touch-press operation of the user on a fingerprint identification module of the terminal device are detected; wherein, the password matching process and the fingerprint identification process are performed sequentially or performed in parallel; and
a display module, configured to light up a screen of the terminal device, when the password matching process is successful and the fingerprint identification process is successful;
wherein the screen unlock password is a graphic unlock password, W registered graphic
unlock passwords are pre-stored, W is an integer greater than 1, and the processing module comprises:
an acquiring unit, configured to acquire the number of times that the W registered graphic unlock passwords are matched within a preset time period;
a first ranking unit, configured to rank the W registered graphic unlock passwords in a descending order according to the number of times that the W registered graphic unlock passwords are matched within the preset time period; and
a first matching unit, configured to match the graphic unlock password with the ranked W registered graphic unlock passwords sequentially.

7. The terminal device of claim 6, further comprising:
a detecting module, configured to detect whether there is an application bound with the screen unlock password; and
an enabling module, configured to enable the application bound with the screen unlock password based on a determination that there is an application bound with the screen unlock password.

8. The terminal device of claim 6, wherein N registered fingerprint templates are pre-stored, N is an integer greater than 1, and the processing module comprises:
an image processing unit, configured to perform an image enhancement process on the original fingerprint image to obtain a target fingerprint image;
a determining unit, configured to determine registration priorities of the N registered fingerprint templates;
a second ranking unit, configured to rank the N registered fingerprint templates in a descending order according to the registration priorities of the N registered fingerprint templates; and
a second matching unit, configured to match the target fingerprint image with the ranked N registered fingerprint templates sequentially.

9. The terminal device of claim 8, wherein the display module is configured to:
acquire current environmental brightness, and light up the screen of the terminal device according to the current environmental brightness.

10. The terminal device of claim 6, wherein the display module is configured to:

acquire current environmental brightness, and light up the screen of the terminal device according to the current environmental brightness.

11. A terminal device, comprising:
a memory, configured to store executable program codes; and
a processor, coupled with the memory;
wherein the processor is configured to invoke the executable program codes stored in the memory to perform the following:
   performing a password matching process on a screen unlock password, triggering an interrupt request and acquiring an original fingerprint image, and performing a fingerprint identification process on the original fingerprint image, when a terminal device is in a screen-off state and the screen unlock password input by a user and a touch-press operation of the user on a fingerprint identification module of the terminal device are detected; wherein, the password matching process and the fingerprint identification process are performed sequentially or performed in parallel; and
   lighting up a screen of the terminal device, when the password matching process is successful and the fingerprint identification process is successful;
wherein the screen unlock password is a graphic unlock password, performing the password matching process on the screen unlock password comprises the following when W registered graphic unlock passwords are pre-stored, W being an integer greater than 1:
   acquiring the number of times that the W registered graphic unlock passwords are matched within a preset time period;
   ranking the W registered graphic unlock passwords in a descending order according to the number of times that the W registered graphic unlock passwords are matched within the preset time period; and
   matching the graphic unlock password with the ranked W registered graphic unlock passwords sequentially.

12. The terminal device of claim 11, wherein the processor is further configured to invoke the executable program codes stored in the memory to perform the following after the lighting up a screen of the terminal device:
   detecting whether there is an application bound with the screen unlock password; and
   enabling the application bound with the screen unlock password based on a determination that there is an application bound with the screen unlock password.

13. The terminal device of claim 11, wherein N registered fingerprint templates are pre-stored, N is an integer greater than 1, and the performing a fingerprint identification process on the original fingerprint image comprises:
   performing an image enhancement process on the original fingerprint image to obtain a target fingerprint image;
   determining registration priorities of the N registered fingerprint templates;
   ranking the N registered fingerprint templates in a descending order according to the registration priorities of the N registered fingerprint templates; and
   matching the target fingerprint image with the ranked N registered fingerprint templates sequentially.

14. The terminal device of claim 13, wherein the lighting up a screen of the terminal device comprises:
   acquiring current environmental brightness, and lighting up the screen of the terminal device according to the current environmental brightness.

15. The terminal device of claim 11, wherein the lighting up a screen of the terminal device comprises:
   acquiring current environmental brightness, and lighting up the screen of the terminal device according to the current environmental brightness.

* * * * *